(12) United States Patent
Papke et al.

(10) Patent No.: US 8,096,374 B1
(45) Date of Patent: Jan. 17, 2012

(54) CONTROL SYSTEM AND VEHICLE INCORPORATING SAME

(75) Inventors: Clark S. Papke, Cortland, NE (US); Gary L. Nicholson, Beatrice, NE (US)

(73) Assignee: Exmark Manufacturing Company, Incorporated, Beatrice, NE (US)

( * ) Notice: Subject to any disclaimer, the term of this patent is extended or adjusted under 35 U.S.C. 154(b) by 0 days.

(21) Appl. No.: 12/827,269

(22) Filed: Jun. 30, 2010

(51) Int. Cl.
*B62D 11/00* (2006.01)
*B62D 11/02* (2006.01)

(52) U.S. Cl. ..................... 180/6.48; 180/19.3

(58) Field of Classification Search .......... 180/6.48, 180/19.3, 19.1, 6.2, 135; 56/10.2 A, 17.1, 56/14.7

See application file for complete search history.

(56) References Cited

U.S. PATENT DOCUMENTS

| | | | |
|---|---|---|---|
| 4,558,558 A | 12/1985 | Horner, Jr. et al. | |
| 5,511,367 A | 4/1996 | Powers et al. | |
| 5,848,520 A | 12/1998 | Arfstrom et al. | |
| 6,098,385 A * | 8/2000 | Turk | 56/11.3 |
| 6,105,348 A * | 8/2000 | Turk et al. | 56/10.5 |
| 6,155,033 A * | 12/2000 | Wians et al. | 56/11.1 |
| 6,301,864 B1 * | 10/2001 | Damie et al. | 56/11.3 |
| 6,557,331 B2 | 5/2003 | Busboom et al. | |
| 6,640,526 B2 * | 11/2003 | Velke et al. | 56/10.8 |
| 6,688,090 B2 * | 2/2004 | Velke et al. | 56/14.7 |
| 6,729,115 B2 * | 5/2004 | Bartel | 56/11.3 |
| 6,782,964 B1 | 8/2004 | Korthals et al. | |
| 6,912,831 B2 * | 7/2005 | Velke et al. | 56/10.9 |
| 6,951,092 B2 * | 10/2005 | Busboom et al. | 56/10.8 |
| 6,968,687 B1 * | 11/2005 | Poplawski et al. | 60/487 |
| 7,213,662 B2 | 5/2007 | Crumly | |
| 7,325,388 B2 * | 2/2008 | Wright et al. | 56/17.1 |
| 7,458,588 B2 | 12/2008 | Kallevig | |
| 7,607,283 B2 * | 10/2009 | Wright et al. | 56/17.1 |
| 7,647,754 B2 * | 1/2010 | Velke et al. | 56/10.8 |
| 7,857,089 B1 | 12/2010 | Sugden et al. | |
| 2001/0001170 A1 * | 5/2001 | Velke et al. | 56/14.7 |
| 2010/0126792 A1 | 5/2010 | Kallevig | |

OTHER PUBLICATIONS

"Peaucellier-Lipkin linkage," *Wikipedia*, [online];[retrieved on Sep. 24, 2010] from the Internet. Retrieved from the Internet:<URL:http://en.wikipedia.org/wiki/Peaucellier-Lipkin_linkage>; 3 pgs.
"Stander® ZK Commerical Mower Owner's Manual—for Stander ZK Serial # 43106 and higher until superseded," Wright Manufacturing, Inc., May 2008, 20 pgs.
"Stander® ZK Commerical Mower Owner's Manual—for Stander ZK Serial # 46090 and higher until superseded," Wright Manufacturing, Inc., Oct. 2008, 20 pgs.

* cited by examiner

*Primary Examiner* — Arpad Fabian-Kovacs
(74) *Attorney, Agent, or Firm* — Mueting, Raasch & Gebhardt, P.A.

(57) ABSTRACT

A vehicle including a linkage-based motion control system for varying a parameter (e.g., velocity) of the vehicle as a geometric relationship between a vehicle input (e.g., velocity control lever) and a vehicle output (e.g., drive train) is modified. In one embodiment, the control system provides a linkage that allows a fixed level of input applied to the control lever to produce a repeatable output to a variable drive unit even as the drive unit is moved relative to the control lever. In another embodiment, an adjustable stop for use with setting a terminal position of a control lever (e.g., a velocity control lever) is provided. Accordingly, the maximum potential speed of the vehicle may be adjusted (e.g., reduced) without altering the speed of the vehicle engine.

27 Claims, 11 Drawing Sheets

CONTROL SYSTEM AND VEHICLE INCORPORATING SAME

TECHNICAL FIELD

Embodiments of the present invention relate generally to motion control systems and, for example, to vehicles (e.g., lawn mowers) and motion control systems for accommodating relative movement between a working and a fixed portion of the vehicle.

BACKGROUND

Power vehicles for carrying out diverse tasks are known. For instance, power lawn mowers are well known for use in turf and lawn maintenance. Such mowers may range from small, walk-behind mowers such as those used by homeowners, to professional grade riding mowers adept at mowing larger areas. While embodiments of the present invention may be directed to control systems for use with a wide variety of power vehicles, it will, for the sake of brevity, be described with respect to power riding or walk behind mowers.

Power mowers typically incorporate a prime mover (e.g., internal combustion engine) and a variable, e.g., hydraulic, drive system. The drive system may include left and right hydraulic motors coupled to left and right drive wheels, respectively. Power may be transmitted from the prime mover to the left and right hydraulic motors, e.g., via one or more pumps, to drive the left and right drive wheels independently. The rotational speed and direction of each drive wheel may then be controlled by associated drive control levers manipulated by an operator. By manipulating the control levers independently, each drive wheel can be separately driven forward or backwards at varying speeds. Thus, the mower may be propelled forwardly or in reverse. By powering one wheel in the forward direction and slowing, stopping, or powering the opposite wheel in the reverse direction, the mower can execute a turn.

With many conventional mowers, the engine and hydraulic pumps are attached to a frame of the mower, while the cutting deck is adjustably positionable at varying elevations relative to the frame to provide for different cutting heights. While effective, moving the cutting deck relative to the engine does have drawbacks. For example, with a belt-powered cutting deck, it is desirable to ensure that the fleeting angle (the belt angle formed between the engine driving sheave and the driven sheave(s) of the cutting deck) is maintained within an acceptable range as the deck moves up and down to minimize belt separation and/or wear. Depending on the distance between the engine and deck, the range of acceptable fleeting angles may be limited.

Another issue with some mowers concerns positioning of the drive control levers. For instance, each drive control lever may generally be positioned between a neutral and a full forward (and a full reverse) position. The levers are generally sized and configured so that the operator may manipulate the levers over their normal range of motion (e.g., from neutral to full forward) without relocating his or her hands. In the full forward position, the levers may be configured to rest against stationary stop bars. Such a configuration permits the operator to hold the levers against a fixed stop during normal operation, reducing potential fatigue in the hands, wrists, and arms. The fixed stop may also provide a degree of lever stability, minimizing inadvertent lever movement as a result of vehicle motion.

While effective, this full forward position may result in a vehicle speed in excess of what is desired for some mowing tasks. To reduce the speed, the operator may back the control levers off from the full forward position. Unfortunately, this technique may prevent the operator from resting the levers against the fixed stops. Alternatively, the engine throttle may be reduced. While throttle reduction is effective at reducing maximum vehicle speed, it also reduces the rotational speed of any attached implements, e.g., the blades of the cutting deck. As a result, cutting efficiency of the mower may be reduced.

SUMMARY

The present invention may overcome these and other issues with prior art mowers by providing a vehicle (e.g., lawn mower) having a chassis; a platform suspended from the chassis; and a platform displacement mechanism configured to move the platform, relative to the chassis, between a first position and a second position. A variable drive unit is also provided and mounted to the platform. The drive unit includes an input member movable, relative to a housing of the drive unit, between a first position and a second position. A control lever is attached to the chassis and operatively connected to the drive unit. The control lever is configured to vary a position of the input member relative to the housing, wherein the control lever is movable incrementally between a first position corresponding to the first position of the input member, and a second position corresponding to the second position of the input member. A control linkage system is also provided and includes: a pivot link pivotally attached to the chassis at a chassis pivot; and a control link. The control link includes: a first end connected to the pivot link; and a second end connected to the control lever. The linkage system also includes a drive link having: a first end pivotally connected to the pivot link at a first drive link pivot; and a second end pivotally connected to the input member at a second drive link pivot. The linkage system is configured to maintain, as the platform is moved between the first and second positions, both the position of the input member relative to the drive unit, and a position of the control link relative to the chassis.

In another embodiment, a vehicle is provided and includes: a chassis supported by one or more drive wheels; a platform suspended from the chassis; a platform lift mechanism configured to raise and lower the platform, relative to the chassis, between a first position and a second position; and a variable drive unit attached to the platform. The drive unit includes an input arm movable, relative to a housing of the drive unit, between a first position and a second position. A prime mover is attached to either the platform or the chassis and coupled to the drive unit to provide power to the same. A control lever is pivotally attached to the chassis and operatively connected to the drive unit, wherein the control lever is configured to vary a position of the input arm relative to the housing of the drive unit. In one embodiment, the control lever is movable incrementally between a first position corresponding to the first position of the input arm, and a second position corresponding to the second position of the input arm. Also included is a drive motion control linkage system having a bellcrank pivotally attached to the chassis at a chassis pivot, wherein the bellcrank includes a first arm and a second arm. The linkage system also includes: a control link having a first end connected to the first arm at a control link pivot, and a second end connected to the control lever; and a drive link. The drive link includes: a first end pivotally connected to the second arm of the bellcrank at a first drive link pivot; and a second end pivotally connected to the input arm at a second drive link pivot.

In yet another embodiment, a vehicle is provided that includes: a chassis; and a control lever pivotally attached to the chassis for pivoting about a pivot axis, the control lever operable to vary a speed of a variable drive unit. The control lever is movable incrementally between a first position corresponding to a first position of an input arm of the drive unit, and a second position corresponding to a second position of the input arm. The vehicle further includes a stop bar positioned to form a stop surface for the control lever when the control lever is in the second position. The stop bar is pivotally connected to the chassis for pivoting between two positions about a pivot axis that is coincident with the pivot axis of the control lever.

The above summary is not intended to describe each embodiment or every implementation of the present invention. Rather, a more complete understanding of the invention will become apparent and appreciated by reference to the following Detailed Description of Exemplary Embodiments and claims in view of the accompanying figures of the drawing.

BRIEF DESCRIPTION OF THE VIEWS OF THE DRAWING

The present invention will be further described with reference to the figures of the drawing, wherein:

FIGS. 3A-3B (collectively referred to as FIG. 3) illustrate portions of the exemplary platform lift mechanism of the mower of FIGS. 1 and 2, wherein: FIG. 3A is a partial side elevation view of the platform lift mechanism; and FIG. 3B is a perspective view of a portion of the mechanism of FIG. 3A;

Figure 1:
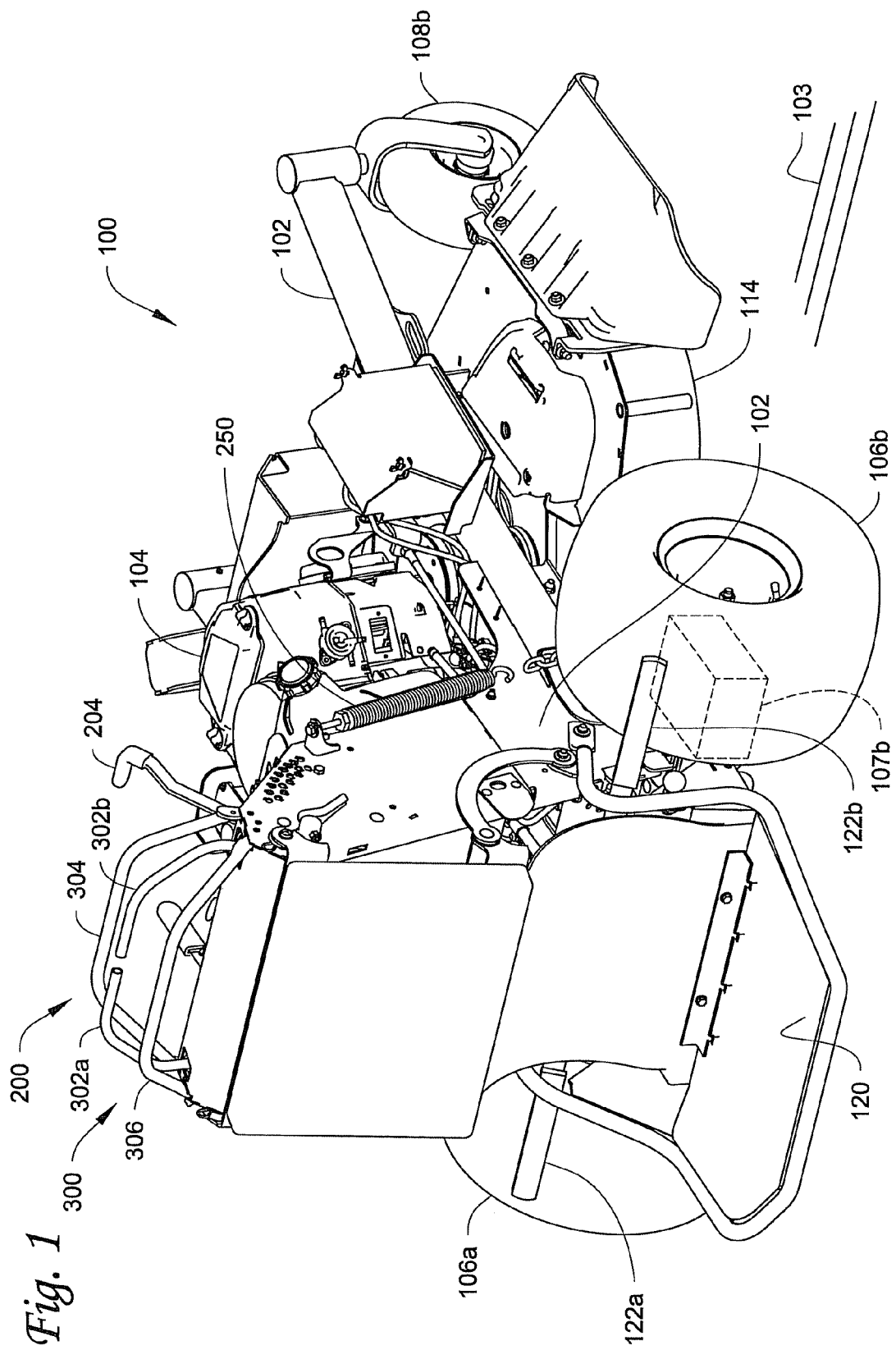
FIG. 1 is a rear perspective view of an exemplary vehicle, e.g., power walk-behind/stand-on mower, incorporating a control system, e.g., motion control linkage system, and a platform lift mechanism, in accordance with embodiments of the present invention, the mower illustrated with a standing platform in a deployed position.

The figures are rendered primarily for clarity and, as a result, are not necessarily drawn to scale. Moreover, certain structure (e.g., various chassis portions/components, fasteners, bearings, cables, and hydraulic components (including but not limited to: conduits; hoses; and fittings, etc.)) may be removed from some or all of the views to better illustrate aspects of the depicted embodiments, or where inclusion of such structure/components is not necessary to an understanding of the various embodiments of the invention. The removal of such structure/components, however, is not to be interpreted as limiting the scope of the invention in any way.

DETAILED DESCRIPTION OF EXEMPLARY EMBODIMENTS

In the following detailed description of illustrative embodiments of the invention, reference is made to the accompanying figures of the drawing which form a part hereof, and in which are shown, by way of illustration, specific embodiments in which the invention may be practiced. It is to be understood that other embodiments may be utilized and structural changes may be made without departing from the scope of the instant invention.

Embodiments of the present invention are generally directed to vehicles such as lawn mowers and the like, and to motion control systems for use with the same. Embodiments of the present invention may include a linkage-based motion control system for accurately adjusting a parameter (e.g., velocity) of the vehicle even as a geometric relationship between an input (e.g., velocity control lever) and an output (e.g., drive train) of the vehicle is modified. As a result, the vehicle may respond to a given operator input in a repeatable manner regardless of the vehicle's geometric configuration.

While the exemplary motion control linkage system is described and illustrated herein as a velocity control system, alternative embodiments may address systems for controlling most any parameter wherein a location of a control input may be varied relative to the associated controlled device.

Other embodiments may further include an adjustable stop bar for use with adjusting a terminal position of a control lever (e.g., a velocity control lever). Accordingly, the maximum potential speed of the vehicle may be adjusted without altering a throttle setting of the vehicle.

FIG. 1 illustrates an exemplary self-propelled vehicle, e.g., a walk-behind or ride-on lawn mowing vehicle 100 that may incorporate a motion control linkage system 300 (see FIG. 4) in accordance with one embodiment of the present invention. While, for the sake of brevity, embodiments of the invention are herein described with respect to a walk-behind/stand-on lawn mower (hereinafter generically referred to merely as a "mower"), those of skill in the art will realize that the invention is equally applicable to other types of walk-behind, ride-behind (e.g., such as those utilizing sulkies), and conventional ride-on mowers, as well as to most any other walk-behind, ride-behind, or ride-on self-propelled utility vehicle (e.g., aerator, snow blower, blower/vacuum, spreader, etc.).

While the general construction of the mower 100 is not necessarily central to an understanding of the invention (e.g., other mower configurations may be utilized without departing from the scope of the invention), one configuration is now briefly described. The mower 100 may also be, in some respects, similar to the mowers described in U.S. patent application Ser No. 12/275,381, the content of which is incorporated herein by reference in its entirety.

Figure 2:
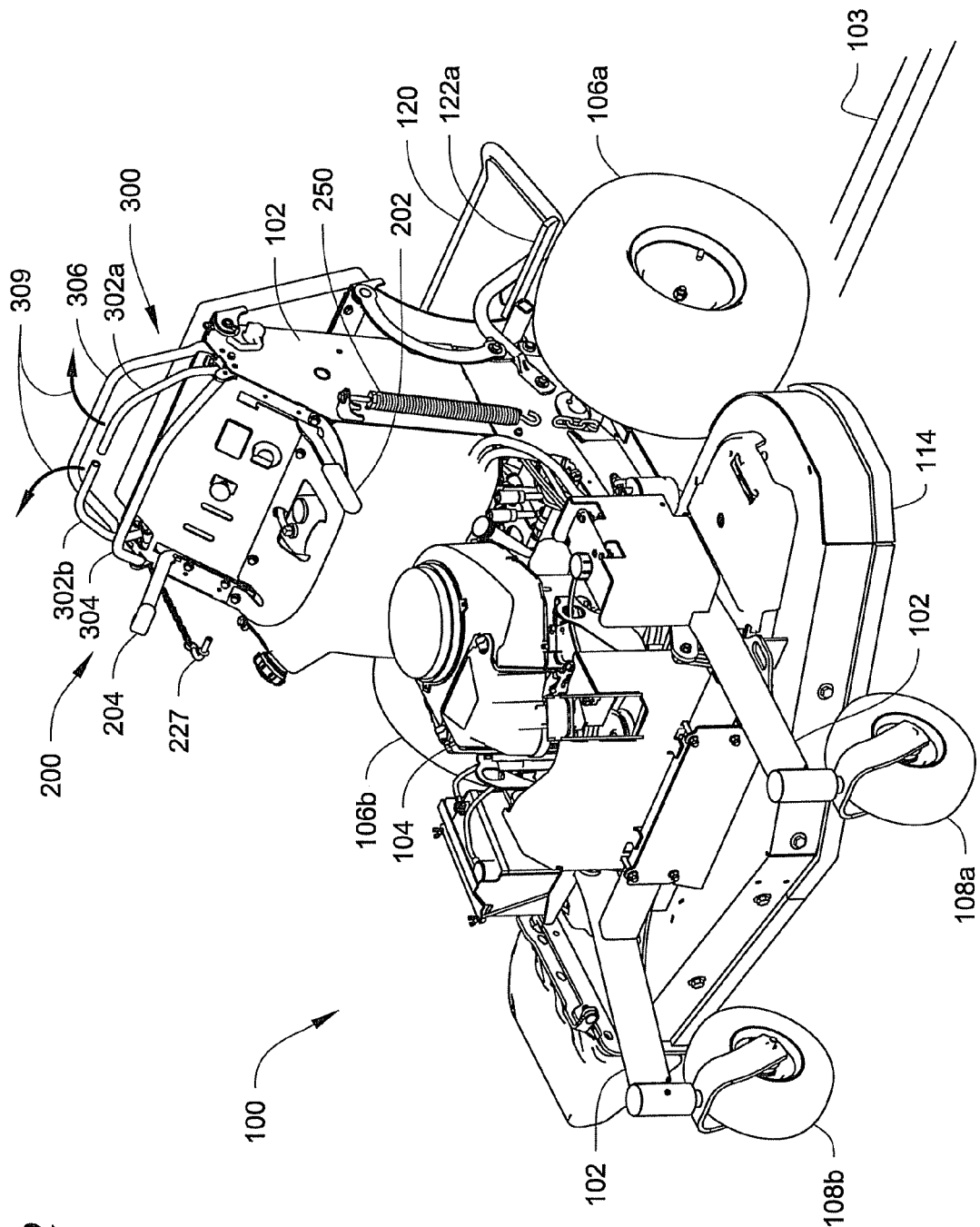
FIG. 2 is a front perspective view of the mower of FIG. 1 illustrating an operator control area.

FIGS. 1 and 2 illustrate the exemplary mower 100 having a chassis 102 and a power source or prime mover, e.g., internal combustion engine 104. A pair of transversely opposing, ground engaging drive members, e.g., first and second drive wheels 106, may be coupled for rotation to opposing sides of the chassis to support and propel the mower 100 relative to a ground surface 103. Each drive wheel 106 may be powered by its own hydraulic wheel motor 107 (only right side motor 107b shown in FIG. 1) attached to the chassis 102 that receives power from, at least in one embodiment, its own variable drive unit, e.g., hydraulic drive unit such as a hydraulic pump 110 (see FIGS. 4 and 6), that is itself powered by the engine 104. While described herein as a hydraulic drive unit, other embodiments may utilize other variable drive units, e.g., electrical or mechanical systems, without departing from the scope of the invention.

The pumps 110 and the engine 104 may be mounted or attached to a platform 112 (see FIG. 4) that, as described in more detail below, is suspended from, and movable relative to, the chassis 102 via a platform displacement, e.g., lift, mechanism. Alternatively, one or both of the pumps engine could be attached to the chassis. The engine 104 may include an output shaft having a sheave (not shown) that provides power to an input sheave 118 on each pump 110 via an endless belt 117 as represented in broken lines in FIG. 7. In the illustrated embodiment, the platform 112 may be raised and lowered between a first and a second position by the platform lift mechanism.

As used herein, relative terms such as "left," "right," "fore," "forward," "aft," "rearward," "top," "bottom," "upper," "lower," "horizontal," "vertical," and the like are from the perspective of one operating the mower 100 while the mower is in an operating configuration, e.g., while the mower 100 is positioned such that the wheels 106 and 108 rest upon the generally horizontal ground surface 103 as shown in FIGS. 1 and 2. These terms are used herein to simplify the description, however, and not to limit the scope of the invention in any way.

Moreover, the suffixes "a" and "b" may be used throughout this description to denote various left- and right-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature.

Operator controls, some of which are described below, may permit independent control of the speed and direction of each drive wheel 106 (e.g., each pump 110), allowing control of mower 100 speed and direction from either a walking or riding (e.g., standing) position generally behind the mower 100. A pair of front swiveling caster wheels 108 (only right wheel visible in FIG. 1), which may be connected to forwardly extending chassis rails, may support the front of the mower 100 in rolling engagement with the ground surface 103.

Although the illustrated mower has the drive wheels 106 in the rear and caster wheels 108 in front, this configuration is not limiting. For example, other embodiments may reverse the location of the wheels, e.g., drive wheels in front and driven or passive wheels in back. Moreover, other configurations may use different wheel configurations altogether, e.g., a tri-wheel configuration. Moreover, while the mower 100 is illustrated as incorporating a hydraulic drive system, other drive systems, e.g., gear or pulley driven systems, may also be utilized without departing from the scope of the invention.

A lawn mower cutting deck 114 may be mounted to a lower side of the platform 112 generally longitudinally between the drive wheels 106 and the caster wheels 108. The cutting deck 114 may include one or more cutting blades 115 (see, e.g., FIG. 4) as is known in the art. The cutting blades may be operatively powered, via spindles passing through to the deck, by a belt 116 (see also FIG. 4) driven by the engine 104. During operation, power is selectively delivered to the cutting deck 114, whereby the blades 115 rotate at a speed sufficient to sever grass and other vegetation passing beneath the cutting deck.

The exemplary mower 100 may also include a standing platform 120 that may be moved between a deployed position as shown in FIGS. 1 and 2, and a stowed position (not shown). In the deployed position, an operator may stand upon the standing platform 120 during vehicle operation. Alternatively, the standing platform 120 may be moved to the stowed position to accommodate the operator in a walk-behind configuration.

As shown in FIG. 2, the mower 100 may further include an operator control area 200. In the illustrated embodiment, the control area 200 may include various operator controls that are mounted to upwardly extending portions of the chassis 102 near the rearward end of the mower such that the controls are located within comfortable reach of the operator standing either behind the mower or upon the platform 120.

The control area 200 may include any number of controls necessary or beneficial to the operation of the mower 100. For instance, a parking brake handle 202 (see FIG. 2) may selectively activate a brake (e.g., brake members 122 shown in FIGS. 1 and 2) when the mower is parked. Other controls, including for example, a throttle lever to control the speed of the engine 104, engine choke, hour meter, and PTO deck engagement control (to initiate and terminate power delivery to the cutting blades of the mower deck 114) may also be provided. Still further, one or more control levers, e.g., drive control levers 302a and 302b, may be provided. The drive control levers 302 may be attached, e.g., pivotally attached, to the chassis 102 and be configured to control the speed and direction of the drive wheels 106a and 106b, respectively, (e.g., via their associated pumps 110a and 110b) as described in more detail below.

Figure 3A:
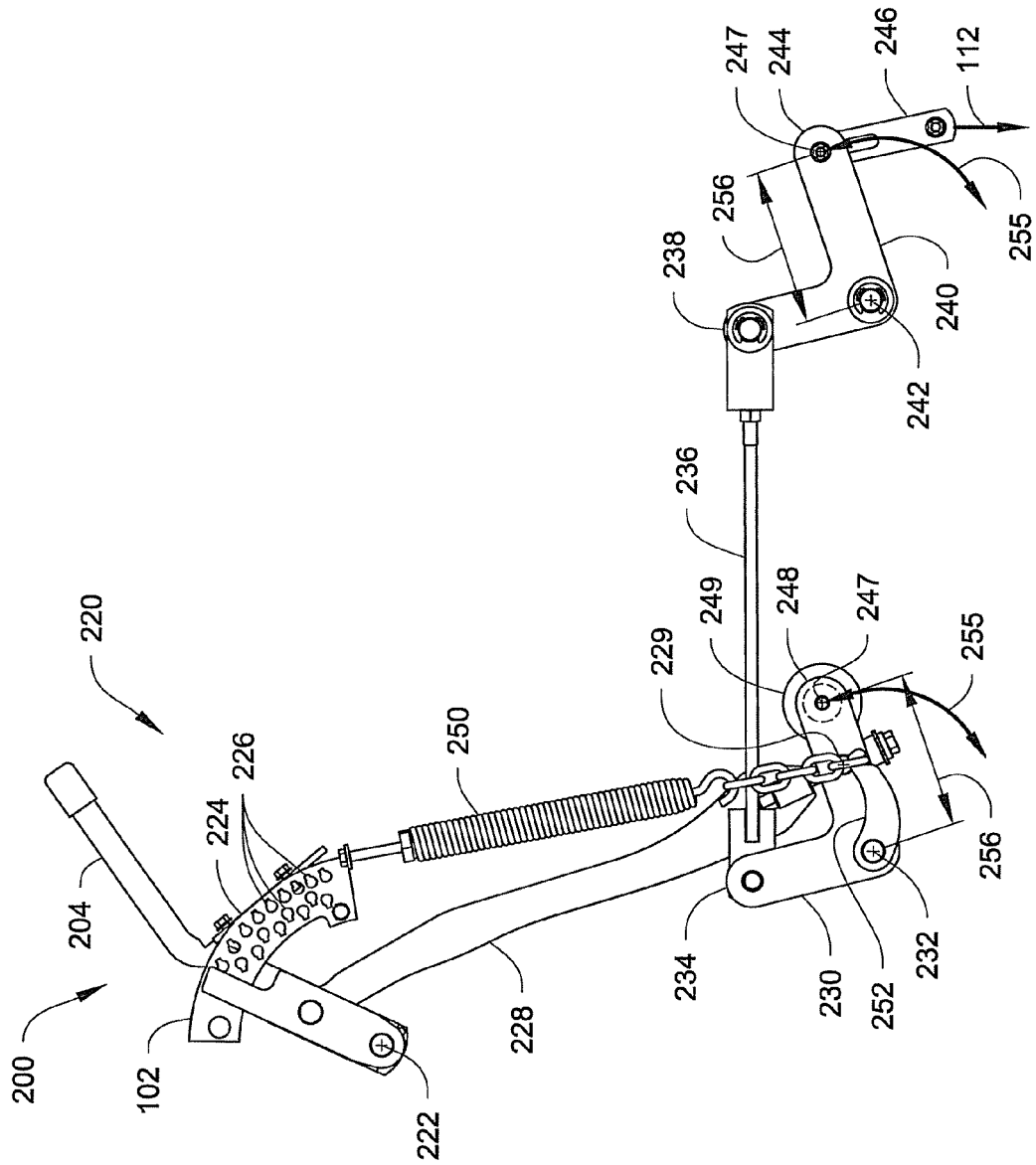

As shown in FIG. 3A, a platform displacement or lift mechanism 220 may also be provided to permit the operator to move (e.g., raise and lower) the platform 112, and thus the cutting deck 114, relative to the chassis 102 between at least a first and second position. In the illustrated embodiment, the mechanism may be manipulated by an adjustment lever 204 that is itself pivotally attached to the chassis 102 at a pivot 222 near the control area 200. In the illustrated embodiment, the mower may further include a pin, e.g., tethered pin 227 (see FIG. 2) operable to engage one of many openings 226 formed in a plate 224 of the frame. To reposition the lever 204 (and thus the platform 112), the lever may be manually lifted upwardly to expose the opening 226 corresponding to the desired platform height. Once the platform is located at or slightly above the desired height, the pin 227 may be inserted into the appropriate opening 226. By then releasing the lever 204, the weight of the platform 112 may then rest against the pin to maintain the platform at the desired height. While illustrated herein as incorporating a manual platform lift mechanism, other embodiments may substitute a powered, e.g., hydraulic or electric lift mechanism, without departing from the scope of the invention.

As used herein, the term "pivot" refers to most any structure or feature that permits one component to pivot or rotate relative to another. The pivots described and illustrated herein may be configured in most any manner that permits such relative motion. For instance, an axle, bolt, or shaft, optionally surrounded by a bushing or bearing, may be used to form the pivot. As various pivot configurations are well known in the art, further detail regarding these components as they relate to embodiments of the present invention are not provided herein. Moreover, for illustration purposes, a pivot may be identified in the figures by pointing either to the general structure defining the pivot, or to a pivot axis defined by the pivot.

Figure 3B:
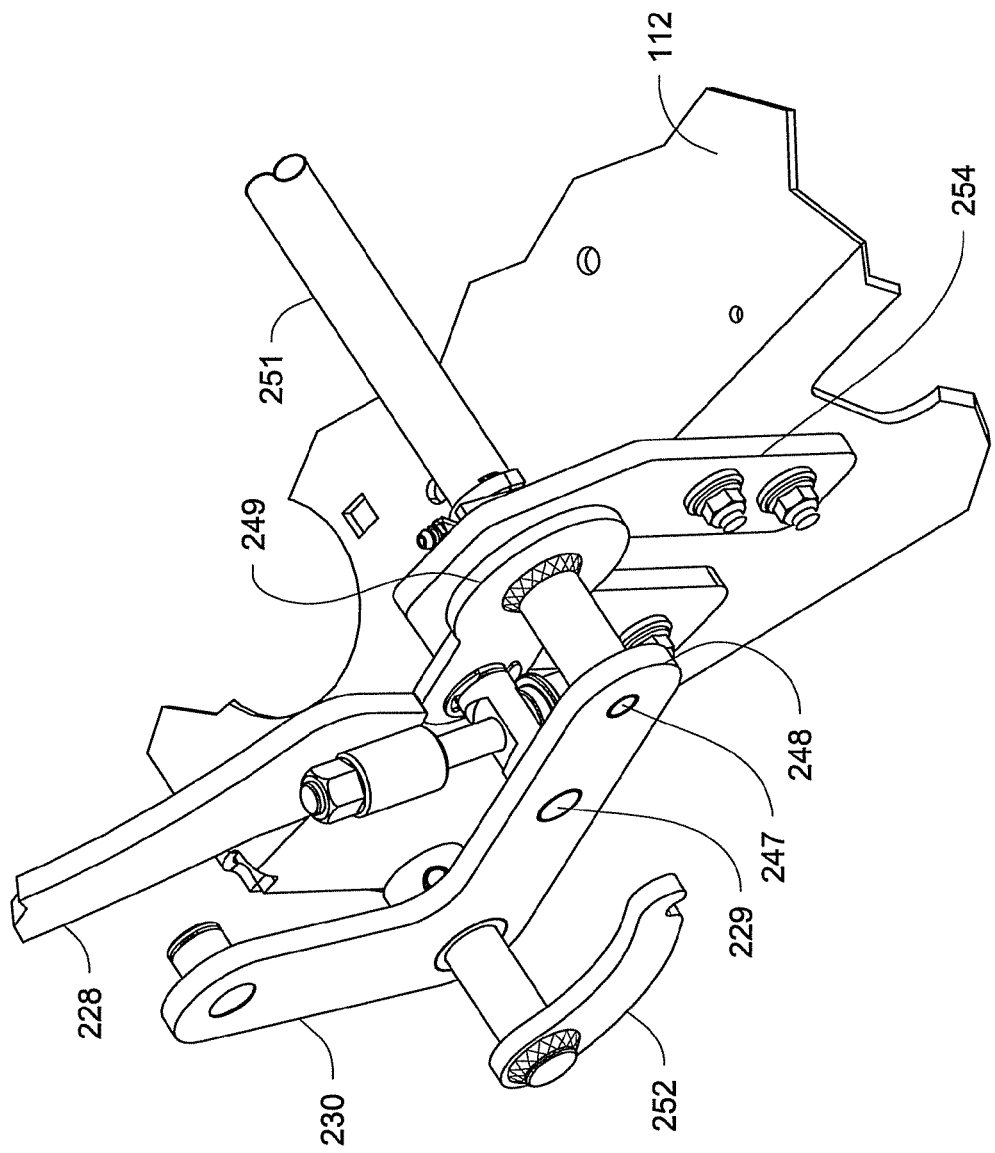

As shown in the embodiment of FIGS. 3A and 3B, the lever 204 may be pivotally attached, at a distance offset from the pivot 222, to a connecting rod 228. At a lower end, the connecting rod 228 may be pivotally connected, via a pivot 229 (see also FIG. 3B), to a rear platform link or bellcrank 230. The rear bellcrank is, in turn, itself pivotally attached to the chassis 102 at a platform chassis pivot 232. A first end 234 of the rear platform bellcrank 230 may be pivotally attached to a tie rod 236 extending forwardly where it attaches to a first end 238 of a similar front platform link or bellcrank 240. The front platform bellcrank 240 may also, like the bellcrank 230, be pivotally attached to the chassis 102 at a platform chassis pivot 242. A second end 244 of the front platform bellcrank 240 and a second end 248 of the rear platform bellcrank 230 may be pivotally attached to the platform 112 at a platform attachment point, e.g., platform pivot 247. In the illustrated embodiment, the front platform/deck bellcrank 240 may utilize an intermediate bracket 246 as shown in FIG. 3A.

The front platform bellcrank 240 may be of the same size and geometry as the rear platform bellcrank 230 and, as a result of the tie rod 236, may be oriented similarly. Accordingly, movement of the lever 204 downwardly (e.g., in the clockwise direction in FIG. 3A) may result in pivotal movement of the front and rear platform bellcranks 230, 240 about the pivots 232 and 242, respectively, in the clockwise direction, effectively lowering the platform 112 and the deck 114. Conversely, raising the lever 204, e.g., pivoting it in a counterclockwise direction about the pivot 222, results in raising the platform 112 and deck 114.

As illustrated in FIG. 3B, the second end 248 of the rear platform bellcrank 230 may support (e.g., be welded or otherwise integral with or fixed to) a shaft 251 that extends transversely across the mower 100. The shaft 251 may extend from the rear platform bellcrank 230 through a transversely spaced link 249 and through one or more brackets 254 (e.g., one on each side of the platform) that support the platform 112. The brackets 254 may hang on the shaft 251, thereby providing an effective pivoting relationship (between the platform 112 and the bellcrank 230) about the centerline of the shaft. The link 249 may, at a first end, be welded to the shaft 251, and at its opposite end, connect to a shaft that defines the pivot 229. On the opposite side of the mower 100, the shaft 251 may connect to a similar or identical mechanism (e.g., to another front and rear platform bellcrank 230, 240, link 249, and another tie rod 236 (see FIGS. 3A and 3B)) on the opposite side of the mower).

As a result of the described geometry, the platform 112 and deck 114 may be attached and lifted relative to the chassis 102 at four separate lift points. Moreover, the respective front and rear platform bellcranks 230, 240 and tie rods 236 may form a 4-bar linkage on each side of the mower 100 that keeps the platform 112 generally level at any selected elevation (even though described as "level," the platform may be configured such that it is slightly inclined (e.g., inclined forwardly) at all elevation settings).

To assist the operator with raising and lowering the platform 112/deck 114, springs 250 may optionally be provided on one or both sides of the mower 100. An upper end of each spring may attach to the chassis 102 (see FIG. 1), while a lower end of each spring may operatively connect to the lever arms(s) 230, e.g., it may connect to a chain that is attached to an auxiliary lever arm 252. The lever arm 252 may be rigidly attached to (e.g., via a connecting tube), but transversely offset from, the lever arm 230 as shown in FIG. 3B so that it pivots in unison with the rear bellcrank.

Using the exemplary platform lift mechanism 220 described and illustrated herein, the platform 112 may move through an arc 255 (see FIG. 3A) as it is raised and lowered. This arc may be defined by a linear distance 256 between the platform chassis pivot 232 (or 242) and the platform attachment point/pivot 247 of the respective platform bellcrank 230 (or 240). In the illustrated embodiment, the distance 256 is identical for all (e.g., both front and rear) platform bellcranks.

Figure 6:
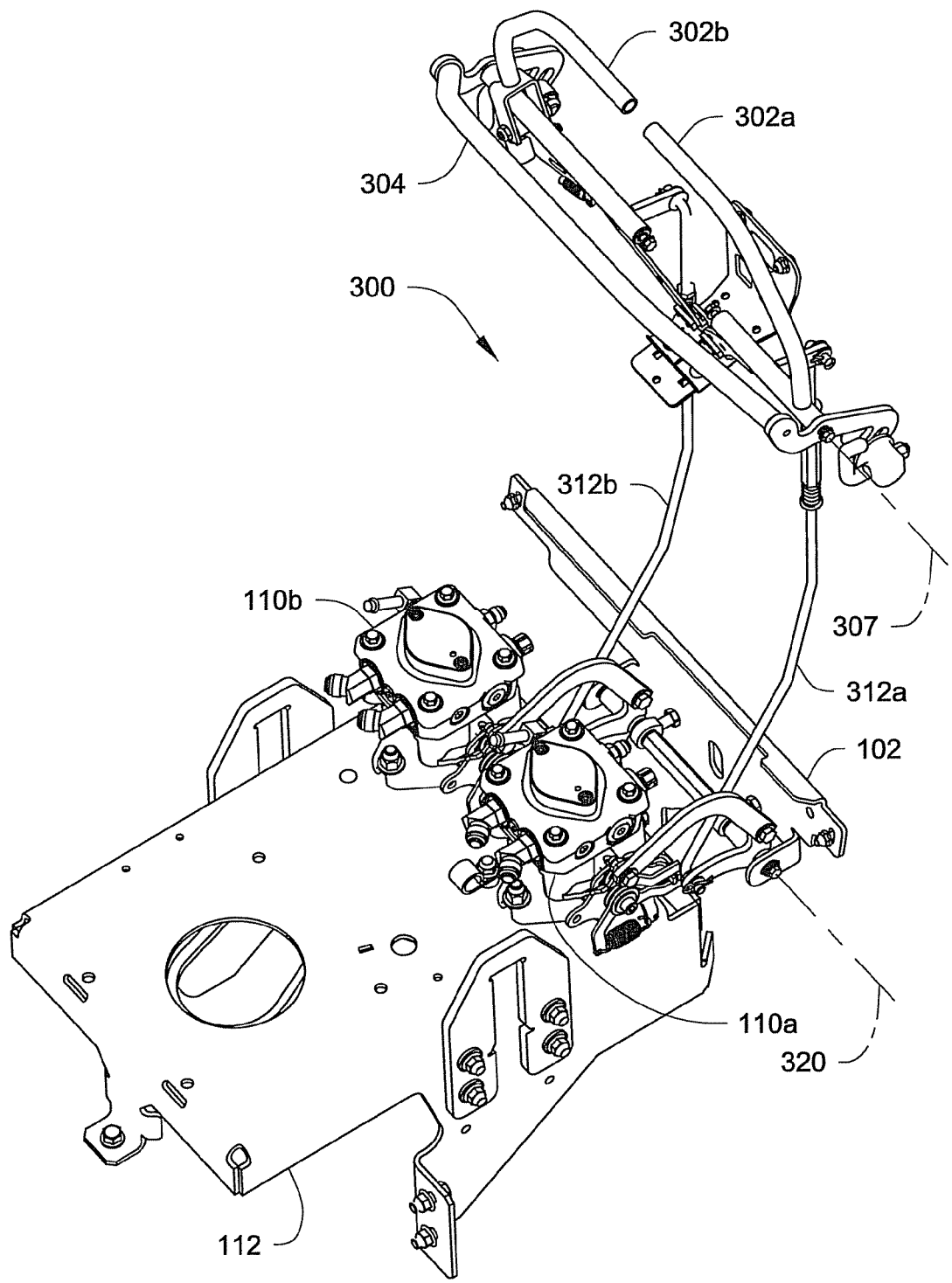
FIG. 6 is a partial perspective view of the mower of FIGS. 1 and 2 illustrating the motion control linkage system.
Figure 7:
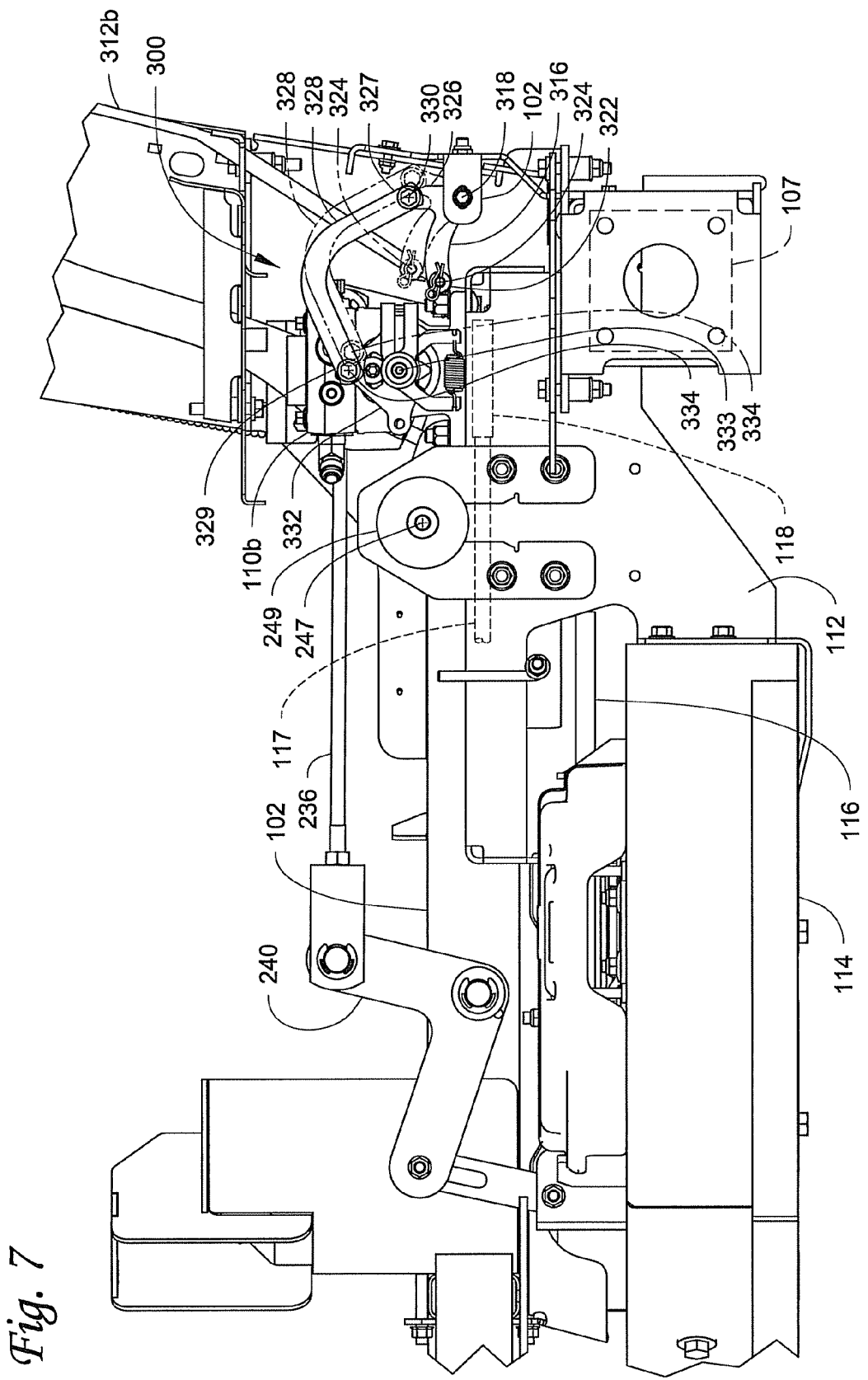
FIG. 7 is a partial enlarged side elevation view of the mower of FIGS. 1 and 2 illustrating the platform in a first or fully raised position, and the motion control linkage system in both a first or neutral position (solid lines) and a second or maximum forward position (broken lines)
Figure 8:
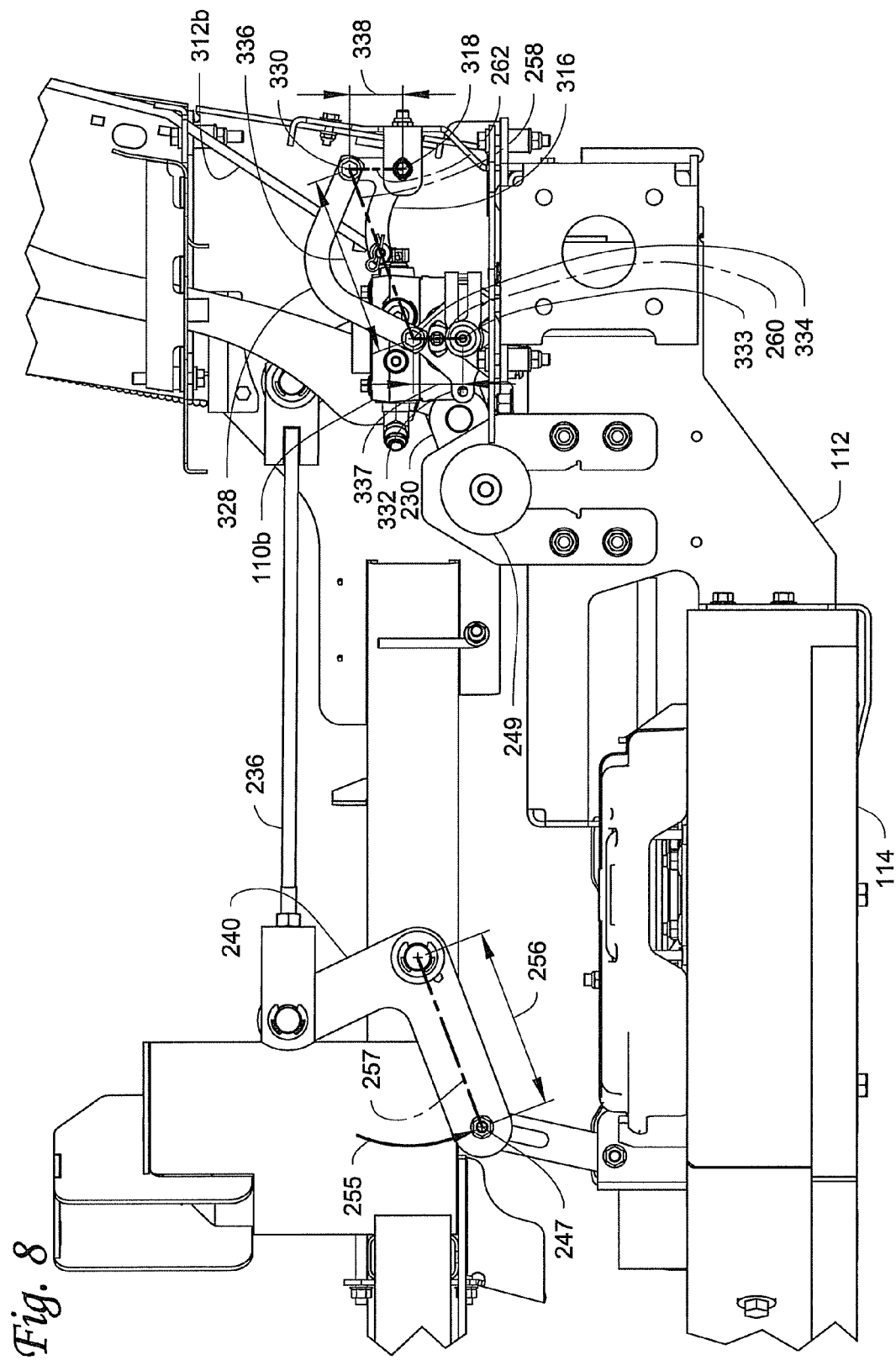
FIG. 8 is a partial enlarged side elevation view similar to FIG. 7 but with the platform shown in a second or fully lowered position, and the motion control linkage system shown in the first or neutral position.

As described elsewhere herein, the engine 104, cutting deck 114, and hydraulic pumps 110 (see FIGS. 4 and 6) may all be attached to the platform 112 and thus move up and down as the platform lift system 220 is manipulated (see also FIGS. 7 and 8). This may, as stated elsewhere herein, provide for relatively planar belt 116 routing between these components, reducing belt wear and potential belt roll-off that may occur in systems having greater fleeting angles. However, as the hydraulic pumps 110 move relative to the chassis 102 and thus to the control levers, a conventional linkage may cause unintended movement of input arms 332 of the pumps 110 (see, e.g., FIG. 7) merely as a result of platform repositioning.

Motion control linkage systems in accordance with embodiments of the present invention may, however, avoid these problems, i.e., they may provide consistent and repeatable input to the hydraulic pumps 110, for a given position of the respective drive control levers 302, regardless of platform location. As a result, consistent mower response may be provided.

Figure 4:
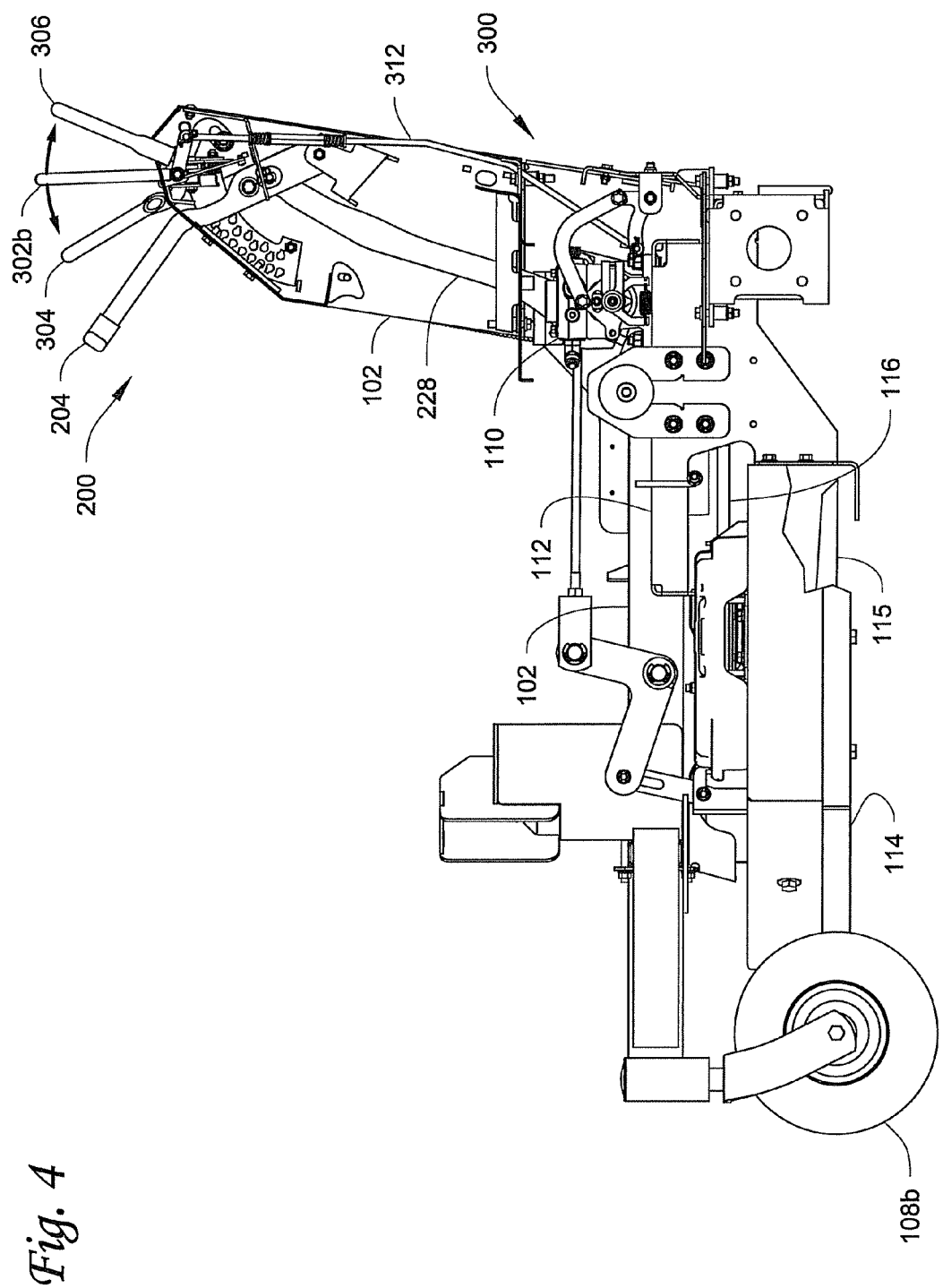
FIG. 4 is a side elevation view of the mower of FIGS. 1 and 2 with some structure removed to illustrate the platform lift mechanism, the motion control linkage system, and the control area.

As shown in FIGS. 1, 2, and 4, the exemplary motion control linkage system 300 may include a first or left drive control lever 302a and a second or right drive control lever 302b pivotally attached to the chassis 102. The control levers 302 may be configured to pivot about a transverse horizontal axis 307 (see FIG. 6) from a first or neutral position towards both a first or forward stop bar 304, and a second or rearward stop bar 306. One or both of the control levers 302 (e.g., 302b as shown in FIG. 2) could be biased for pivotal outward movement (e.g., in a direction 309 about an axis generally parallel to a longitudinal axis of the mower 100). Such a configuration may permit, upon pivotal inward movement of the control lever 302b by the operator to the position shown in FIGS. 1 and 2, activation of an operator presence switch (not shown). As is recognized in the art, activation of the switch may be requisite to activation of some of the mower subsystems.

The control levers 302 may also be biased to the intermediate, neutral position between the two stop bars 304 and 306 for mower operation as shown in FIGS. 1, 2 and 4. Each control lever 302 may be movable between at least the first or neutral position (shown in FIG. 4), which corresponds to a first or zero forward velocity of its respective drive wheel 106/pump 110, and an second or engaged position (abutting the forward stop bar 304), which corresponds to a second or maximum forward velocity of its respective drive wheel/pump. Stated another way, each control lever 302 may independently vary a velocity of its respective drive wheel 106 incrementally between a first or zero forward velocity and a second or predetermined maximum forward velocity without varying the engine throttle. Each lever 302 may additionally be movable to a third position (abutting the rear stop bar 306) corresponding to a third or predetermined maximum reverse velocity of its respective drive wheel. In the illustrated embodiment, the neutral position of the control levers 302 may be located more closely to the rearward stop bar 306 to provide a greater range of movement for forward travel.

Figure 5:
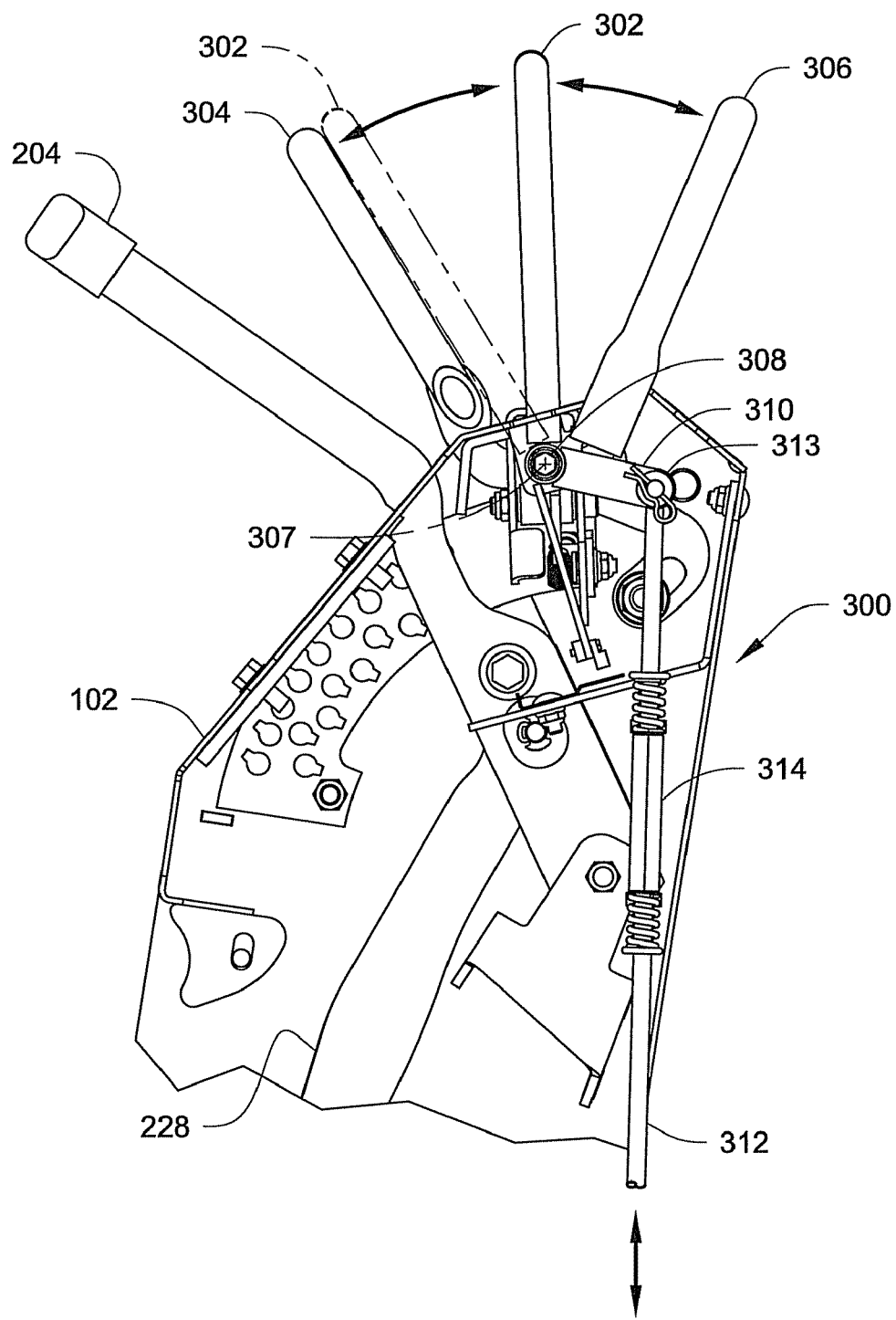
FIG. 5 is an enlarged view of the control area of FIG. 4.

FIG. 5 illustrates an enlarged partial view of the control area of FIG. 4. As illustrated in this view, each control lever 302 may pivot relative to the chassis 102 at the transverse horizontal axis 307 (see also FIG. 6) defined by a pivot 308. Each control lever 302 may also include a secondary lever arm 310 (which is offset from the pivot 308) that pivotally receives an upper end of a control link 312 at a pivot 313. The control link 312 may be segmented and include an adjustment mechanism 314 to lengthen or shorten the control link after installation. As one can appreciate from FIG. 5, movement of the control lever 302 towards the forward stop bar 304 (or towards the rear stop 306) results in movement of the control link upwardly (or downwardly) as indicated by the arrows in this view.

FIG. 6 illustrates a perspective view of the motion control linkage system 300. The platform 112 and the pumps 110 are also illustrated in this view. However, various other structures, e.g., engine 104 and most of the chassis 102, are removed for visibility. As this view illustrates, the control system 300 may include independent linkage systems for each side of the mower 100, e.g., for each control lever 302 and its associated pump 110. While the system 300 is illustrated in the figures as including dual mechanisms to independently control the drive wheel 106 on each side of the mower 100, control systems for alternate applications may utilize a single linkage without departing from the scope of the invention.

FIG. 7 is an enlarged view of a portion of the mower of FIG. 4. This view illustrates a lower portion of one side of the control linkage system 300 that operatively connects one control link 312 (e.g., link 312b) to its respective pump 110 (e.g., pump 110b). As shown in this view, a pivot link, e.g., bellcrank 316, may be pivotally attached to the chassis 102 at a chassis pivot 318 for pivoting about a horizontal transverse axis 320 (see FIG. 6). Each bellcrank 316 may include a first arm defining a first end 322 that is offset from the chassis pivot 318. The first arm of the bellcrank may be pivotally connected to a proximal end of the control link 312 at a control link pivot 324. The bellcrank 316 may also include a second arm defining a second end 326 pivotally connected to a first end 327 of a drive link 328 at a first drive link pivot 330. A second end 329 of the drive link 328 may pivotally connect to a distal end of the pump input member or arm 332 at a second drive link pivot 334. The input arm 332 may move, e.g., pivot, about an input pivot 333 relative to a housing of the pump, thereby repositioning an internal swashplate within the pump to alter the flow of hydraulic fluid delivered to the respective wheel motor 107 (see also FIG. 1). In the illustrated embodiment, the drive link may be curvilinear in shape to better accommodate the mower configuration. However, other shapes, e.g., straight, are certainly possible without departing from the scope of the invention.

The solid line representation of the drive link 328 and bellcrank 316 in FIG. 7 represents the geometry of the system 300 when the drive control lever 302 is in the first or neutral position (see solid line representation of the control lever 302 in FIG. 5). Conversely, the broken line representation of the drive link 328 and bellcrank 316 in FIG. 7 represents the geometry of the system 300 when the drive control lever 302 is in the second or engaged position (see broken line representation of the control lever 302 in FIG. 5). Thus, movement of the control levers 302 may vary a position of the respective pump input arm 332 relative to the pump housing. For instance, as is evident in FIG. 7, incremental movement of the drive control lever 302 from the first or neutral position to the second or engaged position causes the pump input arm 332 (to which the drive link 328 is attached) to pivot, relative to the pump housing, from a first or pump neutral position (wherein the pump input arm is approximately vertical, e.g., about 12 o'clock in FIG. 7), to an adjustable second or maximum position (wherein the pump input arm is rotated slightly clockwise in FIG. 7, e.g., to about one o'clock as shown in broken lines). This relationship between control levers 302 and their respective input arms 332 exists regardless of whether the platform is in (or is moving between) the first position, the second position or any intermediate position.

FIG. 8 is a view similar to FIG. 7, but with the platform 112 shown at its second or lowest position (as opposed to the first or highest position shown in FIG. 7) and the drive control lever 302/system 300 shown in the neutral position. The platform height adjustment may be accommodated as described elsewhere herein, e.g., with the lift mechanism 220 illustrated in FIGS. 3A-3B. Once again, as the platform 112 and deck 114 move from the elevation of FIG. 7 to the elevation of FIG. 8, movement occurs along the arc 255 defined by the distance 256 of each of the bellcranks 230 and 240 (see also FIG. 3A). Moreover, as the platform/cutting deck move, each drive link 328 may pivot about the first drive link pivot 330 from the position shown in solid lines in FIG. 7 to the position shown in FIG. 8.

In the embodiment illustrated in FIGS. 7 and 8, the drive link 328 has an effective length 336 (e.g., linear distance measured between the first and second drive link pivots 330 and 334) that is equal to the effective length 256 of the platform bellcranks. Moreover, a line 257 (see FIG. 8) extending between each platform chassis pivot 232 and its associated platform pivot 247 may be parallel to a line 258 extending between the first and second drive link pivots 330 and 334.

Furthermore, as illustrated in FIG. 8, a linear distance 337 between the input pivot 333 and the second drive link pivot 334 may be equal to a linear distance 338 between the chassis pivot 318 and the first drive link pivot 330, while a line 260 extending between the input pivot 333 and the second drive link pivot 334 may be parallel to a line 262 extending between the chassis pivot 318 and the first drive link pivot 330.

As a result of this geometry, the drive link 328 may accommodate pivoting of the platform 112 without imparting any unintended displacement to the input arm 332 of the pump. Thus, the platform 112/cutting deck 114 may be moved to any available height without altering the position of the pump input arm 332. The linkage system may therefore maintain, as the platform 112 is moved between its first and second positions, both the position of the input member 332 relative to the drive unit 110, and a position of the control link 312 (as well as the control lever 302) relative to the chassis 102.

While the control system is shown only in the neutral position in FIG. 8, the same result may occur regardless of the position of the drive control lever 302. For instance, placement of the drive control lever 302 in the second (e.g., forward) or engaged position (broken lines in FIG. 5) with the platform 112 at its lowest setting as shown in FIG. 8 would result in positioning the pump input arm 332 in the same location as it is positioned when the platform is at its highest setting (see broken line rendering in FIG. 7). In fact, the platform 112 could even be repositioned during operation (while the control handles remain in a given position) without any effect on pump configuration/mower speed.

Figure 9:
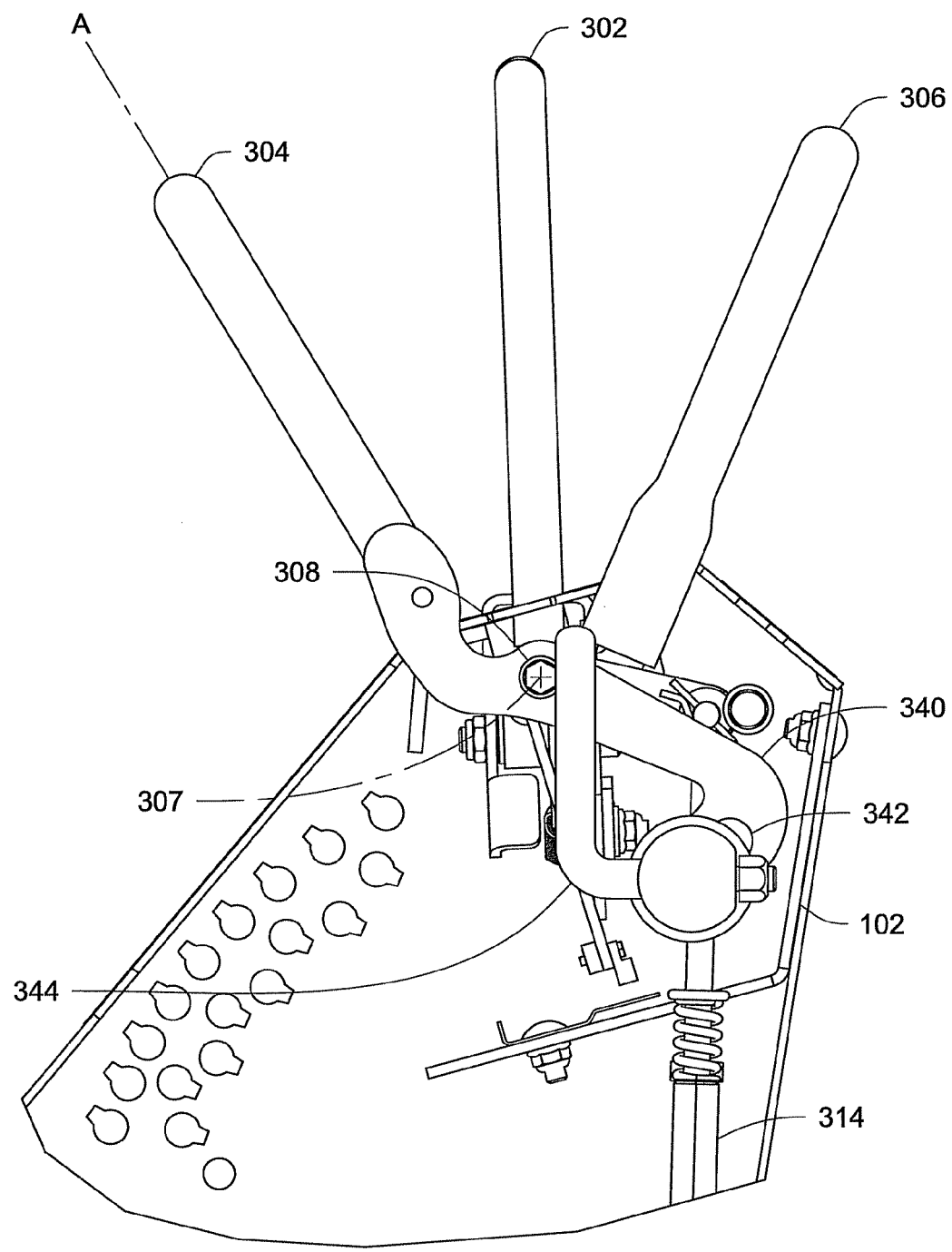
FIG. 9 is a partial side elevation view of the control area with a control lever shown in the first or neutral position and a control lever stop bar shown in a first position "A"

In some embodiments, the motion control linkage system 300 may further include a velocity limiting mechanism, an exemplary embodiment of which will now be described with reference to FIGS. 9 and 10. Generally speaking, the velocity limiting mechanism permits the operator to limit or adjust a maximum potential forward velocity of the mower (the speed resulting when the levers 302 are resting against the forward stop bar 304) without varying the engine throttle.

In the illustrated embodiment, the velocity limiting mechanism is configured as a selectively pivotable forward stop bar 304 defining a stop surface against which the drive control levers may rest when in the second or engaged position. When in a first or maximum potential velocity position "A", the forward stop bar 304 is positioned at a first distance from the drive control lever 302 (when the latter is in the neutral position) as shown in FIG. 9. In a second or reduced maximum potential velocity position "B", the forward stop bar 304 is positioned at a second distance from the drive control lever 302 that is less than the first distance as shown in FIG. 10.

Figure 10:
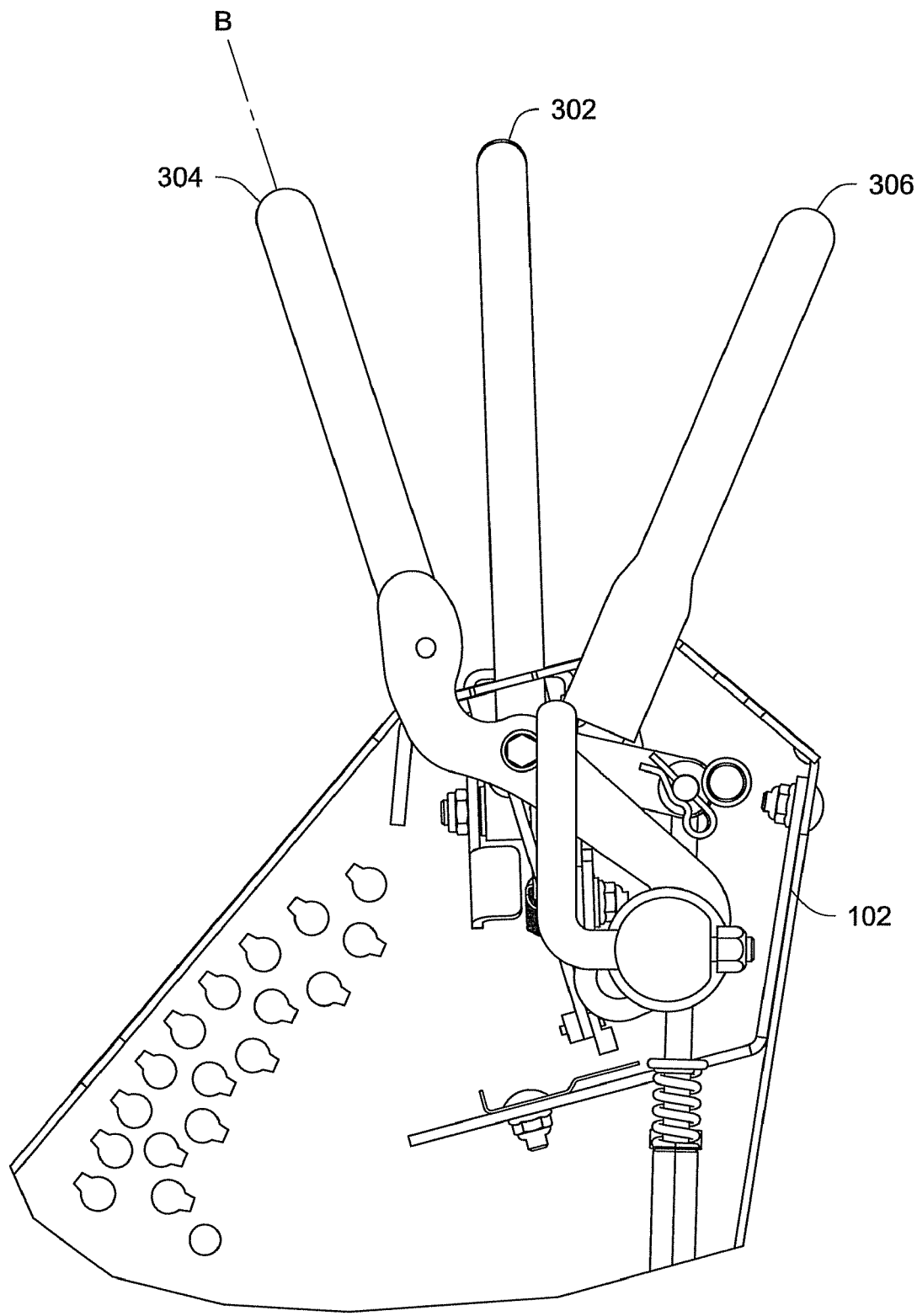
FIG. 10 is a partial side elevation view of the control area similar to FIG. 9 but with the control lever in the first or neutral position and the control lever stop bar in a second position "B."

As a result, when the operator wants to reduce the potential maximum speed of the mower (e.g., to conduct operator training or to address cut quality under various mowing conditions) but still wishes to maintain optimal engine speed and/or the comfort associated with holding the drive control levers against the fixed stop bar 304, the forward stop can be repositioned as shown in FIG. 10 (or repositioned to any intermediate position). Repositioning the forward stop from position A of FIG. 9 to position B of FIG. 10 may, in one embodiment, reduce the maximum potential speed of the mower (for a given throttle setting) from a first maximum vehicle speed setting, e.g., about eight miles/hour, to a second or reduced maximum vehicle speed setting, e.g., about four miles/hour.

In one embodiment, the forward stop bar 304 is pivotally attached to the mower chassis 102 for pivoting about a transverse pivot axis that is coincident with the pivot axis 307 (see FIG. 6) of the drive control levers 302. As a result, the stop bar 304, independent of its position, stays within the same arc of rotation as that in which the levers 302 move. Accordingly, each drive control lever 302 contacts the stop bar 304 at the same location regardless of the stop bar position. By avoiding all but movement about a common axis for both the drive control levers 302 and the stop bar 304, comfortable and repeatable positioning of the drive control levers relative to the stop bar is maintained.

While not illustrated herein, the stop bar 304 could be split such that a separate stop bar is provided for each of the drive control levers 302. Moreover, the mower 100 could also include a rear stop bar (not shown) to adjust the maximum rearward velocity of the mower (e.g., the maximum rearward velocity resulting from pulling the drive control levers to a fully aft position).

The velocity limiting mechanism may also include a lock mechanism to secure the forward stop bar 304 in place. In one embodiment, the forward stop bar 304 includes a bracket 340 that sits along one or both sides of the chassis 102. The bracket may define a slot 342 through which a clamp 344 passes and threads to the chassis 102. By loosening the clamp 344, the forward stop bar 304 may pivot within the confines defined by the clamp sitting within the slot 342. By tightening the clamp 344, the stop bar may be locked in position A of FIG. 9, position B of FIG. 10, or any intermediate position. The slot 342 may include detents or the like to indicate discrete locations, or may permit generally infinite positioning.

Embodiments of the instant application may therefore provide a motion control system and vehicle incorporating the same. Control systems configured in accordance with embodiments of the present invention may include a linkage for accurately adjusting a parameter (e.g., velocity) of the vehicle even as a geometric relationship between an input (e.g., velocity control lever) and an output (e.g., drive train) of the vehicle is modified. Other embodiments may further address velocity limiting mechanisms, illustrative embodiments of which are described herein, that may be used in conjunction with, or independently of, the exemplary motion control system.

Illustrative embodiments of this invention are discussed and reference has been made to possible variations within the scope of this invention. These and other variations, combinations, and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof.

What is claimed is:

1. A vehicle, comprising:
   a chassis;
   a platform suspended from the chassis;
   a platform displacement mechanism configured to move the platform, relative to the chassis, between a first position and a second position;
   a variable drive unit mounted to the platform and comprising an input member movable, relative to a housing of the drive unit, between a first position and a second position;
   a control lever attached to the chassis and operatively connected to the drive unit, the control lever configured to vary a position of the input member relative to the housing, the control lever movable incrementally between a first position corresponding to the first position of the input member, and a second position corresponding to the second position of the input member; and
   a control linkage system comprising:
      a pivot link pivotally attached to the chassis at a chassis pivot;
      a control link comprising: a first end connected to the pivot link; and a second end connected to the control lever; and
      a drive link comprising: a first end pivotally connected to the pivot link at a first drive link pivot; and a second end pivotally connected to the input member at a second drive link pivot;
   wherein the linkage system is configured to maintain, as the platform is moved between the first and second positions, both the position of the input member relative to the drive unit, and a position of the control link relative to the chassis.

2. The vehicle of claim 1, further comprising a prime mover operatively coupled to the drive unit to provide power to the same.

3. The vehicle of claim 1, wherein the pivot link comprises: a bellcrank including a first arm pivotally connected to the control link; and a second arm defining the first drive link pivot.

4. The vehicle of claim 1, wherein the platform displacement mechanism comprises a platform link pivotally attached to: the chassis at a platform chassis pivot; and to the platform at a platform attachment point, wherein a linear distance between the platform chassis pivot and the platform attachment point is equal to a linear distance between the first and second drive link pivots.

5. The vehicle of claim 4, wherein a line extending between the platform chassis pivot and the platform attachment point is parallel to a line extending between the first and second drive link pivots.

6. The vehicle of claim 1, wherein the input member is pivotable about an input pivot of the housing of the drive unit, and wherein a linear distance between the input pivot and the second drive link pivot is equal to a linear distance between the chassis pivot and the first drive link pivot.

7. The vehicle of claim 6, wherein a line extending between the input pivot and the second drive link pivot is parallel to a line extending between the chassis pivot and the first drive link pivot.

8. A vehicle, comprising:
a chassis supported by one or more drive wheels;
a platform suspended from the chassis;
a platform lift mechanism configured to raise and lower the platform, relative to the chassis, between a first position and a second position;
a variable drive unit attached to the platform and comprising an input arm movable, relative to a housing of the drive unit, between a first position and a second position;
a prime mover attached to either the platform or the chassis and coupled to the drive unit to provide power to the same;
a control lever pivotally attached to the chassis and operatively connected to the drive unit, the control lever configured to vary a position of the input arm relative to the housing of the drive unit, the control lever movable incrementally between a first position corresponding to the first position of the input arm, and a second position corresponding to the second position of the input arm; and
a drive motion control linkage system comprising:
a bellcrank pivotally attached to the chassis at a chassis pivot, the bellcrank comprising a first arm and a second arm;
a control link having a first end connected to the first arm at a control link pivot, and a second end connected to the control lever; and
a drive link comprising: a first end pivotally connected to the second arm of the bellcrank at a first drive link pivot; and a second end pivotally connected to the input arm at a second drive link pivot.

9. The vehicle of claim 8, wherein the drive motion control linkage system is configured to maintain, as the platform is moved between the first and second positions, both the position of the input arm relative to the housing of the drive unit, and a position of the control link relative to the chassis.

10. The vehicle of claim 8, wherein the platform further comprises a lawn mower cutting deck.

11. The vehicle of claim 8, wherein incremental movement of the control lever from the first position to the second position results in corresponding incremental movement of the input arm, relative to the housing of the drive unit, from the first position to the second position regardless of whether the platform is in, or is moving between, the first position, the second position, or any intermediate position.

12. The vehicle of claim 8, wherein the drive motion control linkage system, the variable drive unit, and the control lever are associated with a first side of the vehicle, and the vehicle further comprises a second drive motion control linkage system, a second variable drive unit, and a second control lever associated with a second opposite side of the chassis.

13. The vehicle of claim 8, further comprising a stop bar configured to limit movement of the control lever, the stop bar pivotally attached to the chassis for pivoting between two positions, wherein the stop bar is pivotable about a transverse axis coincident with a pivot axis about which the control lever pivots.

14. The vehicle of claim 13, wherein the stop bar further comprises a lock mechanism configured to lock the stop bar at either of the two positions or at a position intermediate the two positions.

15. The vehicle of claim 8, wherein the platform lift mechanism comprises one or more platform bellcranks each pivotally attached to: the chassis at a platform chassis pivot; and to the platform at a platform pivot, wherein a linear distance between the platform chassis pivot and the platform pivot is equal to a linear distance between the first and second drive link pivots.

16. The vehicle of claim 15, wherein a line extending between the platform chassis pivot and the platform pivot is parallel to a line extending between the first and second drive link pivots.

17. The vehicle of claim 8, wherein the input arm is pivotable about an input pivot of the housing of the drive unit, and wherein a linear distance between the input pivot and the second drive link pivot is equal to a linear distance between the chassis pivot and the first drive link pivot.

18. The vehicle of claim 17, wherein a line extending between the input pivot and the second drive link pivot is parallel to a line extending between the chassis pivot and the first drive link pivot.

19. A lawn mowing vehicle comprising:
a chassis;
transversely opposing first and second drive wheels coupled to the chassis;
a platform suspended from the chassis;
a platform lift mechanism configured to move the platform between a first position and a second position relative to the chassis;
first and second variable drive units attached to the platform and operatively coupled to the first and second drive wheels, respectively, wherein each drive unit comprises an input arm pivotable, about an input pivot of a housing of the drive unit, between a first position and a second position;
a prime mover attached to either the platform or the chassis and operatively coupled to both the first and second variable drive units to provide power to the same;
first and second drive control levers pivotally attached to the chassis and coupled to, and operable to independently vary a position of, the input arm of the first and second variable drive units, respectively, each control lever movable incrementally between a first position corresponding to the first position of its respective input arm, and a second position corresponding to the second position of its respective input arm; and
a drive motion control linkage system comprising:
first and second bellcranks each pivotally attached to the chassis at a chassis pivot;
first and second control links each comprising: a first end connected to the first and second bellcranks, respectively; and a second end connected to the first and second drive control levers, respectively; and
first and second drive links each comprising: a first end pivotally connected, at a first drive link pivot, to a second arm of the first and second bellcranks, respectively, and a second end connected to the input arm, at a second drive link pivot, of the first and second variable drive units, respectively.

20. The vehicle of claim 19, further comprising a hydraulic wheel motor associated with each of the first and second drive wheels, each motor attached to the chassis and operatively connected to one of the first and second variable drive units.

21. The vehicle of claim 19, wherein the drive motion control linkage system is configured so that movement of the platform between the first and second positions does not result in movement of either: the first or second bellcranks relative to the chassis; or the input arms of the first and second drive units relative to the respective housings of the first and second drive units.

22. The vehicle of claim 19, wherein movement of the first drive control lever from the first position to the second position results in movement of the input arm of the first variable drive unit from the first position to the second position regardless of whether the platform is in, or is moving between, the first position, the second position, or any intermediate position.

23. The vehicle of claim 19, wherein the platform lift mechanism comprises one or more platform bellcranks each pivotally attached to: the chassis at a platform chassis pivot; and to the platform at a platform pivot, wherein a linear distance between the platform chassis pivot and the platform pivot is equal to a linear distance between the first and second drive link pivots of the first drive link.

24. The vehicle of claim 23, wherein a line extending between the platform chassis pivot and the platform pivot is parallel to a line extending between the first and second drive link pivots of the first drive link.

25. The vehicle of claim 19, wherein one or both of the first and second drive links is curvilinear.

26. The vehicle of claim 19, further comprising an adjustable stop bar positioned to form a stop surface for the first drive control lever when the first drive control lever is in the second position, the stop bar pivotally connected to the chassis for pivoting between two positions about a pivot axis coincident with a pivot axis of the first drive control lever.

27. The vehicle of claim 26, wherein the stop bar further comprises a lock mechanism configured to lock the stop bar at either of the two positions or at a position intermediate the two positions.

\* \* \* \* \*